US012665619B2

(12) United States Patent (10) Patent No.: US 12,665,619 B2
Hase (45) Date of Patent: Jun. 23, 2026

(54) COMMUNICATION DEVICE AND ELECTRONIC DEVICE

(71) Applicant: Panasonic Intellectual Property Management Co., Ltd., Osaka (JP)

(72) Inventor: Kazutoshi Hase, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 298 days.

(21) Appl. No.: 18/628,687

(22) Filed: Apr. 6, 2024

(65) Prior Publication Data

US 2024/0275413 A1 Aug. 15, 2024

Related U.S. Application Data

(63) Continuation of application No. PCT/JP2022/036229, filed on Sep. 28, 2022.

(30) Foreign Application Priority Data

Oct. 22, 2021 (JP) ................................. 2021-173394

(51) Int. Cl.
H04B 1/00 (2006.01)
(52) U.S. Cl.
CPC ......... H04B 1/0064 (2013.01); H04B 1/0067 (2013.01)
(58) Field of Classification Search
CPC .... H04B 1/006; H04B 1/1027; H04B 1/3838; H04B 1/0067; H04B 1/3877; H04B 1/401;

(Continued)

(56) References Cited

U.S. PATENT DOCUMENTS

2006/0079275 A1 4/2006 Ella et al.
2007/0093270 A1* 4/2007 Lagnado .............. H04B 7/0871
455/562.1

(Continued)

FOREIGN PATENT DOCUMENTS

CN 110545122 A 12/2019
JP 2005-269111 A 9/2005

(Continued)

OTHER PUBLICATIONS

International Search Report for corresponding Application No. PCT/JP2022/036229, mailed Dec. 27, 2022.

*Primary Examiner* — Ajibola A Akinyemi
(74) *Attorney, Agent, or Firm* — Renner, Otto, Boisselle & Sklar, LLP

(57) ABSTRACT

A communication device includes a communication module including a plurality of communication terminals, a plurality of internal antennas configured to be connectable to the plurality of communication terminals, a plurality of external connecting terminals configured to be connectable to the plurality of communication terminals, a first switch device disposed between the plurality of communication terminals and the plurality of internal antennas and switching connection destinations of the plurality of communication terminals to the plurality of internal antennas or the plurality of external connecting terminals, a second switch device disposed between the first switch device and the plurality of external connecting terminals and connecting one or more communication terminals among the plurality of communication terminals connected to the first switch device to one or more external connecting terminals among the plurality of external connecting terminals, and a controller controlling the first switch device and the second switch device.

10 Claims, 16 Drawing Sheets

(58) Field of Classification Search
CPC .......... H04B 1/18; H04B 1/3888; H04B 1/00;
H04B 1/38; H04B 17/318; H04B 7/0814;
H04B 1/005; H04B 1/0064; H04B 1/04;
H04B 1/086; H04B 1/3827; H04B 1/40
USPC ...................................................... 455/552.1
See application file for complete search history.

(56) References Cited

U.S. PATENT DOCUMENTS

| | | | |
|---|---|---|---|
| 2011/0250926 A1 | 10/2011 | Wietfeldt et al. | |
| 2018/0331702 A1* | 11/2018 | Uchida | H04B 1/38 |
| 2018/0337670 A1* | 11/2018 | Zhu | H03K 17/16 |
| 2018/0358980 A1* | 12/2018 | Ruelke | H03G 3/008 |
| 2019/0288716 A1 | 9/2019 | Bai | |

FOREIGN PATENT DOCUMENTS

| | | |
|---|---|---|
| JP | 2007-124647 A | 5/2007 |
| JP | 2010-220010 A | 9/2010 |
| JP | 2013-516110 A | 5/2013 |
| JP | 2021-506171 A1 | 2/2021 |
| WO | 2011/084715 A1 | 7/2011 |
| WO | 2019/174305 A1 | 9/2019 |

* cited by examiner

FIG. 3

| | COMMUNICATION SYSTEM | COMMUNICATION TERMINAL | |
|---|---|---|---|
| FIRST COMMUNICATION MODULE | WWAN | T1 | WWAN-main |
| | | T2 | WWAN-aux |
| | | T3 | WWAN-3rd |
| | | T4 | WWAN-4th |
| SECOND COMMUNICATION MODULE | GNSS | T5 | RF |
| THIRD COMMUNICATION MODULE | WLAN | T6 | WLAN-main |
| | | T7 | WLAN- aux |

FIG. 4

| INTERNAL ANTENNA | | | | | | | EXTERNAL CONNECTING TERMINAL | | | |
|---|---|---|---|---|---|---|---|---|---|---|
| ANT1 | ANT2 | ANT3 | ANT4 | ANT5 | ANT6 | ANT7 | CH1 | CH2 | CH3 | CH4 |
| T1/ None | T2/ None | T3/ None | T4/ None | T5/ None | T6/ None | T7 | T1/ None | T2/ T5/ None | T2/ T3/ None | T4/ T6/ None |

FIG. 6

| FIRST SWITCH DEVICE | | | | | | SECOND SWITCH DEVICE | | | 5V POWER SOURCE |
|---|---|---|---|---|---|---|---|---|---|
| SW11 | SW12 | SW13 | SW14 | SW15 | SW16 | SW21 | SW22 | SW23 | |
| CS11 | CS21/ CS22/ CS23 | CS36 | CS41 | CS24 | CS34/ CS35 | CS25 | CS31 | CS42/ CS43 | CS5V |
| 1: PC-P1<br>0: PC-P2 | 1/0/0: PC-P1<br>0/1/0: PC-P2<br>0/0/1: PC-P3 | 1: PC-P1<br>0: PC-P2 | 1: PC-P1<br>0: PC-P2 | 1: PC-P1<br>0: PC-P2 | 1/0: PC-P1<br>0/1: PC-P2 | 1: PC-P1<br>0: PC-P2 | 1: PC-P1<br>0: PC-P2 | 1/0: PC-P1<br>0/1: PC-P2 | 1: On<br>0: Off |

FIG. 8

| FIRST SWITCH DEVICE | | | | | | SECOND SWITCH DEVICE | | | 5V POWER SOURCE |
|---|---|---|---|---|---|---|---|---|---|
| SW11 | SW12 | SW13 | SW14 | SW15 | SW16 | SW21 | SW22 | SW23 | |
| CS11 | CS21/ CS22/ CS23 | CS36 | CS41 | CS24 | CS34/ CS35 | CS25 | CS31 | CS42/ CS43 | CS5V |
| 0: PC-P2 | 0/1/0: PC-P2 | 0: PC-P2 | 1: PC-P1 | 0: PC-P2 | 0/1: PC-P2 | 0: PC-P2 | 1: PC-P1 | 1/0: PC-P1 | 1: On |

FIG. 10

| FIRST SWITCH DEVICE | | | | | | SECOND SWITCH DEVICE | | | 5V POWER SOURCE |
|---|---|---|---|---|---|---|---|---|---|
| SW11 | SW12 | SW13 | SW14 | SW15 | SW16 | SW21 | SW22 | SW23 | |
| CS11 | CS21/ CS22/ CS23 | CS36 | CS41 | CS24 | CS34/ CS35 | CS25 | CS31 | CS42/ CS43 | CS5V |
| 0: PC-P2 | 0/0/1: PC-P3 | 1: PC-P1 | 1: PC-P1 | 0: PC-P2 | 1/0: PC-P1 | 1: PC-P1 | 1: PC-P1 | 0/1: PC-P2 | 1: On |

FIG. 12

| FIRST SWITCH DEVICE | | | | | | SECOND SWITCH DEVICE | | | 5V POWER SOURCE |
|---|---|---|---|---|---|---|---|---|---|
| SW11 | SW12 | SW13 | SW14 | SW15 | SW16 | SW21 | SW22 | SW23 | |
| CS11 | CS21/CS22/CS23 | CS36 | CS41 | CS24 | CS34/CS35 | CS25 | CS31 | CS42/CS43 | CS5V |
| 0: PC-P2 | 0/1/0: PC-P2 | 0: PC-P2 | 1: PC-P1 | 0: PC-P2 | 0/1: PC-P2 | 0: PC-P2 | 1: PC-P1 | 1/0: PC-P1 | 0: OFF |

FIG. 13

| Path-through Configuration | | | | | CH1 | CH2 | | | | CH3 | | CH4 | |
| CH1 | CH2 | CH3 | CH4 | 5V | CS11 | CS21 | CS22 | CS23 | CS24 | CS31 | CS34 | CS41 | CS5V |
|---|---|---|---|---|---|---|---|---|---|---|---|---|---|
| T1 (WWAN -main) | T2 (WWAN -GPS) | T3 (WWAN -3rd) | T4 (WWAN -4th) | On | 0 | 0 | 1 | 0 | 1 | 1 | 0 | 0 | 1 |
| T1 (WWAN -main) | T5 (GNSS) | - (None) | T6 (WLAN -main) | On | 0 | 0 | 0 | 1 | 0 | 0 | 1 | 1 | 1 |
| T1 (WWAN -main) | T2 (WWAN -aux) | T3 (WWAN -3rd) | T4 (WWAN -4th) | OFF | 0 | 0 | 1 | 0 | 1 | 1 | 0 | 0 | 0 |

FIG. 15

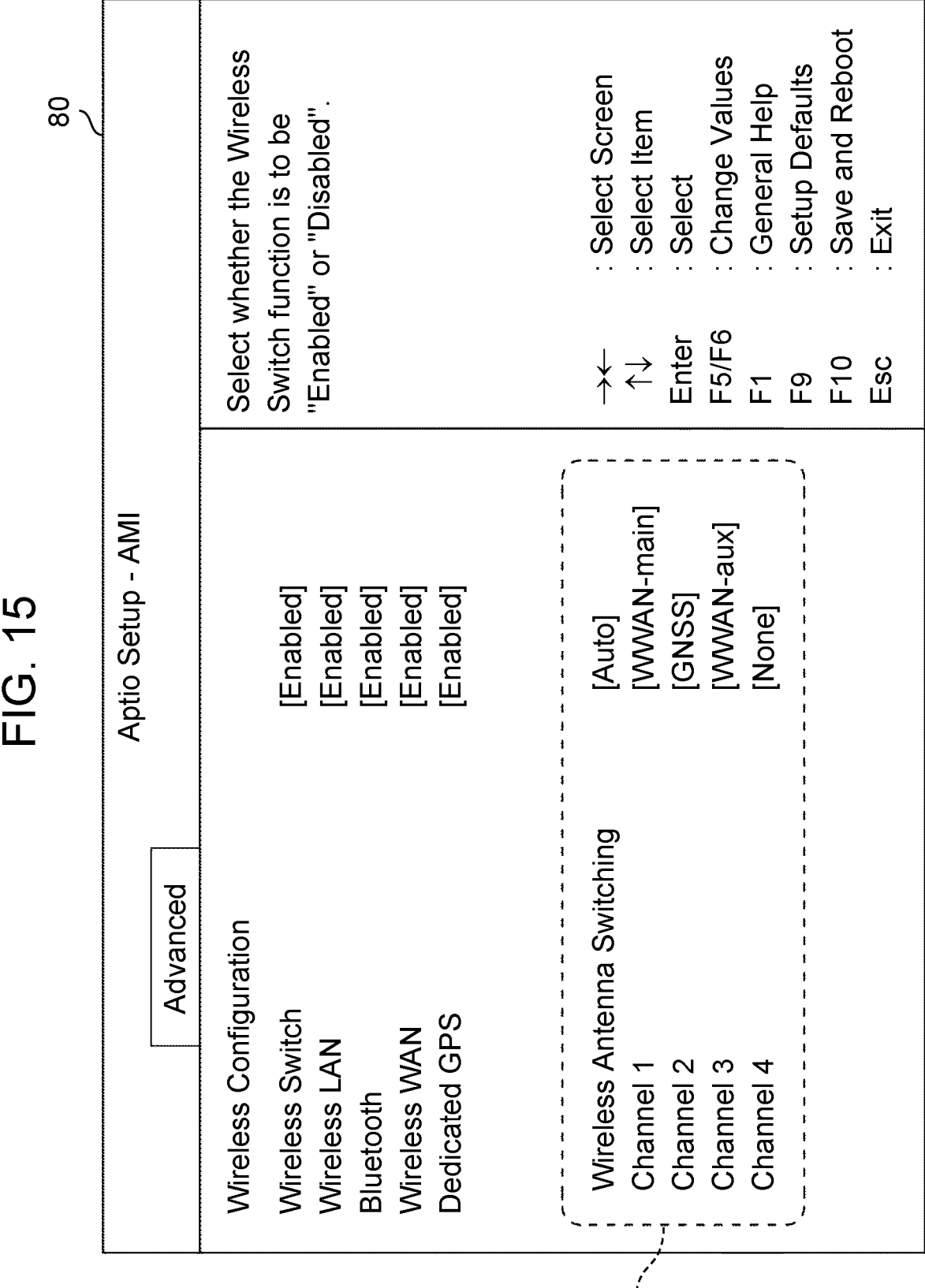

Aptio Setup - AMI

| Advanced | |
|---|---|

Wireless Configuration

Wireless Switch        [Enabled]        Select whether the Wireless
Wireless LAN          [Enabled]        Switch function is to be
Bluetooth             [Enabled]        "Enabled" or "Disabled".
Wireless WAN          [Enabled]
Dedicated GPS         [Enabled]

Wireless Antenna Switching    [Auto]
Channel 1             [WWAN-main]
Channel 2             [GNSS]
Channel 3             [WWAN-aux]
Channel 4             [None]

→←    : Select Screen
↑↓    : Select Item
Enter  : Select
F5/F6  : Change Values
F1     : General Help
F9     : Setup Defaults
F10    : Save and Reboot
Esc    : Exit

80

81

COMMUNICATION DEVICE AND ELECTRONIC DEVICE

BACKGROUND

1. Technical Field

The present disclosure relates to a communication device and an electronic device.

2. Description of the Related Art

Patent Literature (PTL) 1 discloses a technology for supporting a plurality of radios on a wireless device with a limited number of antennas. In PTL 1, at least one antenna can be selected for at least one radio among the plurality of antennas, for example, based on a configurable mapping of the plurality of antennas to the plurality of radios. One or more antennas may be shared between radios to reduce the number of antennas. The at least one radio may be connected to the at least one antenna, for example, via a switch plexer. Antenna selection may be performed dynamically.

PTL 1 is Japanese Translation Publication No. 2013-516110 of PCT Publication WO2011/084715.

SUMMARY

An object of the present disclosure is to provide a communication device and an electronic device that improve the degree of freedom of an external connecting terminal.

A communication device according to one aspect of the present disclosure includes: a communication module including a plurality of communication terminals; a plurality of internal antennas configured to be connectable to the plurality of communication terminals; a plurality of external connecting terminals configured to be connectable to the plurality of communication terminals; a first switch device that is disposed between the plurality of communication terminals and the plurality of internal antennas and switches connection destinations of the plurality of communication terminals to the plurality of internal antennas or the plurality of external connecting terminals; a second switch device that is disposed between the first switch device and the plurality of external connecting terminals and connects one or more communication terminals among the plurality of communication terminals connected to the first switch device to one or more external connecting terminals among the plurality of external connecting terminals; and a controller that controls the first switch device and the second switch device.

An electronic device according to one aspect of the present disclosure includes the communication device according to the aspect described above.

The present disclosure can provide a communication device and an electronic device in which the degree of freedom of an external connecting terminal is improved.

BRIEF DESCRIPTION OF THE DRAWINGS

FIG. 3 is a table illustrating an example of a communication system and a communication terminal of a communication module.

FIG. 4 is a table illustrating an example of a connection setting of a plurality of communication terminals, a plurality of internal antennas, and a plurality of external connecting terminals.

FIG. 6 is a table illustrating an example of control signals for controlling a first switch device and a second switch device.

FIG. 8 is a table illustrating an example of control signals in Example 1.

FIG. 10 is a table illustrating an example of control signals in Example 2.

FIG. 12 is a table illustrating an example of control signals in Example 3.

FIG. 13 is a table illustrating an example of control signals when an Invert signal is used.

FIG. 15 is a schematic diagram illustrating an example of a connection setting of a plurality of external connecting terminals.

DETAILED DESCRIPTION

Background of Present Disclosure

Figure 1:
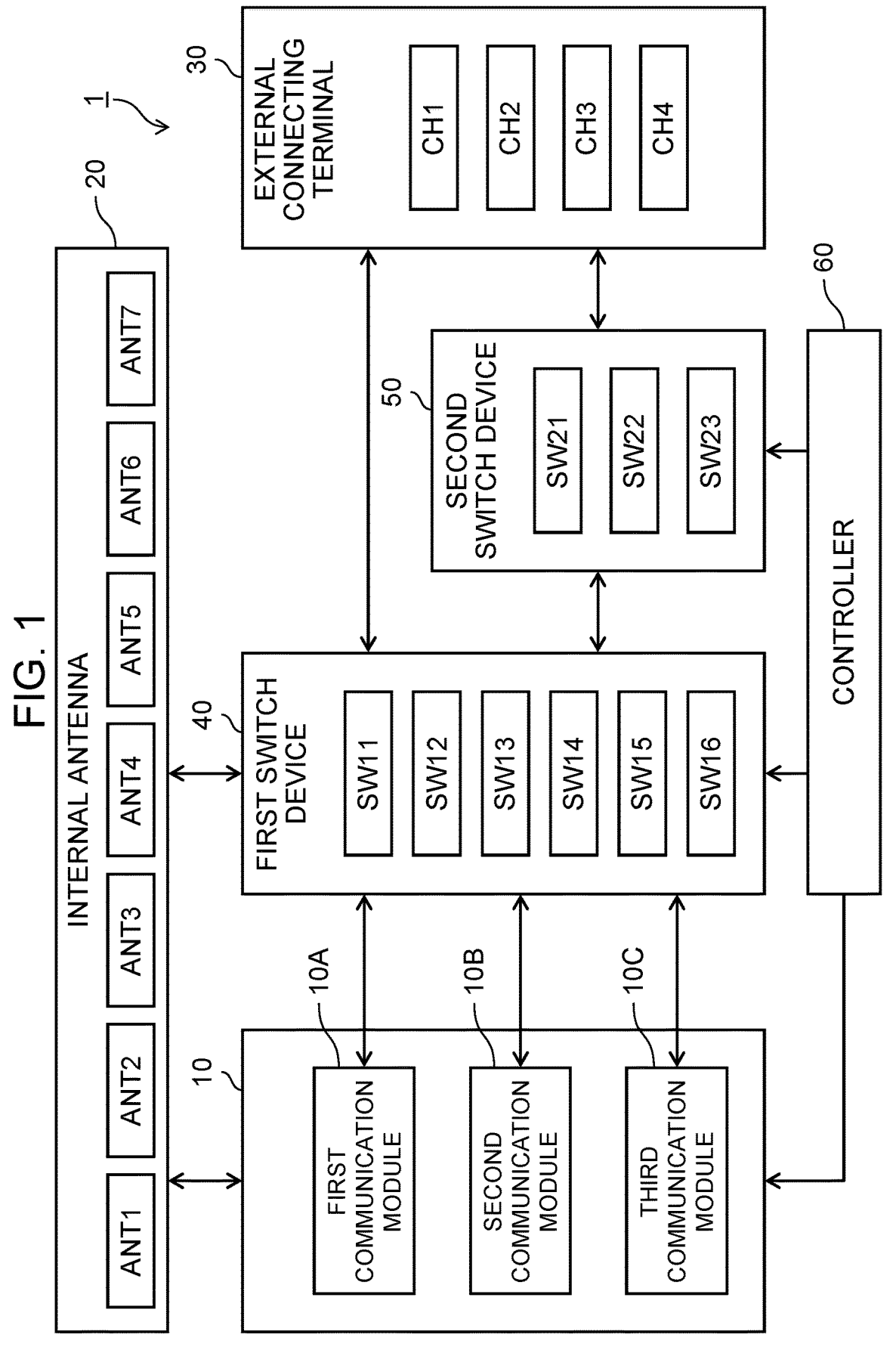
FIG. 1 is a schematic block diagram illustrating an example of a configuration of a communication device of a first exemplary embodiment according to the present disclosure.

For example, a communication device that switches between an internal antenna and an external antenna to transmit and receive a wireless signal is known. The communication device is mounted on, for example, an electronic device such as a laptop PC, a tablet PC, or a smartphone. The internal antenna is an antenna housed in an electronic device. The external antenna is an antenna disposed outside the electronic device and connected to an external connecting terminal of the communication device.

The communication device includes a plurality of communication terminals, and switches connection destinations of the plurality of communication terminals to a plurality of internal antennas and a plurality of external connecting terminals by using a switch. The plurality of external connecting terminals are connected to the plurality of communication terminals in a one-to-one relationship. That is, one predetermined communication terminal is connected to one external connecting terminal. Thus, there is a problem that the degree of freedom of the external connecting terminal is small.

In addition, in recent years, the number of communication terminals, internal antennas, and external antennas tends to increase in order to support the 5th Generation Mobile Communication System (5G). As the number of communication terminals, internal antennas, and external antennas increases, wiring for connecting the communication terminals, the internal antennas, and the external connecting terminals increases. In addition, when a plurality of communication modules having different communication methods is mounted on an electronic device, a substrate is prepared for each communication system. In this manner, in the configuration in which a plurality of external connecting terminals are connected to a plurality of communication terminals in a one-to-one relationship, there is a problem that the assembly configuration becomes complicated when the number of communication terminals, internal antennas, and external antennas is increased or when a plurality of communication systems are supported.

Thus, the inventors of the present invention have found a configuration including a first switch device that switches connection destinations of a plurality of communication terminals of a wireless communication module to a plurality of internal antennas or a plurality of external connecting terminals, and a second switch device that selects one or more communication terminals among the plurality of communication terminals connected to the first switch device and connects the selected one or more communication terminals to one or more external connecting terminals, and have reached the following invention.

A communication device according to a first aspect of the present disclosure includes a communication module including a plurality of communication terminals, a plurality of internal antennas disposed to be connectable to the plurality of communication terminals, a plurality of external connecting terminals disposed to be connectable to the plurality of communication terminals, a first switch device that is disposed between the plurality of communication terminals and the plurality of internal antennas and switches connection destinations of the plurality of communication terminals to the plurality of internal antennas or the plurality of external connecting terminals, a second switch device that is disposed between the first switch device and the plurality of external connecting terminals, selects one or more communication terminals among the plurality of communication terminals connected to the first switch device, and connects the one or more communication terminals to one or more external connecting terminals among the plurality of external connecting terminals, and a controller that controls the first switch device and the second switch device.

Such a configuration can improve the degree of freedom of the external connecting terminals.

In a communication device according to a second aspect of the present disclosure, the first switch device may include a plurality of first switches disposed between the plurality of communication terminals and the plurality of internal antennas, the second switch device may include a plurality of second switches disposed between the plurality of first switches and the plurality of external connecting terminals, and each of the plurality of second switches may be connected in series with two or more first switches among the plurality of first switches.

Such a configuration can further improve the degree of freedom of the external connecting terminals.

In a communication device according to a third aspect of the present disclosure, the communication module may include at least one of a first communication module corresponding to Wireless Wide Area Network (WWAN) communication, a second communication module that receives a Global Navigation Satellite System (GNSS) signal, and a third communication module corresponding to Wireless Local Area Network (WLAN) communication.

Such a configuration can improve the degree of freedom of the external connecting terminals while supporting WWAN communication, GNSS communication, or WLAN communication.

In a communication device according to a fourth aspect of the present disclosure, the communication module may include the first communication module, and the number of the plurality of external connecting terminals may be from four to seven inclusive.

Such a configuration can further improve the degree of freedom of the external connecting terminals.

In a communication device according to a fifth aspect of the present disclosure, the plurality of external connecting terminals may include a first external connecting terminal, a second external connecting terminal, a third external connecting terminal, and a fourth external connecting terminal, the first communication module may include a first communication terminal, a second communication terminal, a third communication terminal, and a fourth communication terminal that transmit and receive a WWAN signal, the second communication module may include a fifth communication terminal corresponding to a GNSS signal, the third communication module may include a sixth communication terminal and a seventh communication terminal that transmit and receive a WLAN signal, the first external connecting terminal may be connected to the first communication terminal, and the second switch device may include a first external connection selection switch that selects either the second communication terminal or the fifth communication terminal and connects the selected second communication terminal or fifth communication terminal to the second external connecting terminal, a second external connection selection switch that selects either the second communication terminal or the third communication terminal and connects the selected second communication terminal or third communication terminal to the third external connecting terminal, and a third external connection selection switch that selects either the fourth communication terminal or the sixth communication terminal and connects the selected fourth communication terminal or sixth communication terminal to the fourth external connecting terminal.

Such a configuration can further improve the degree of freedom of the external connecting terminals while supporting WWAN communication, GNSS communication, or WLAN communication.

In a communication device according a sixth aspect of the present disclosure, the second communication terminal may correspond to the WWAN signal and a WWAN-GPS signal, when the first external connection selection switch connects the second communication terminal and the second external connecting terminal, the controller does not have to connect the second communication terminal and the third external connecting terminal in the second external connection selection switch, and when the second external connection selection switch connects the second communication terminal and the third external connecting terminal, the controller does not have to connect the second communication terminal and the second external connecting terminal in the first external connection selection switch.

Such a configuration can efficiently switch between the first switch device and the second switch device.

In a communication device according to a seventh aspect of the present disclosure, the controller may control the first switch device and the second switch device using an Invert signal.

Such a configuration can reduce the number of control signals for controlling the first switch device and the second switch device.

An electronic device according to an eighth aspect of the present disclosure includes the communication device according to the aspects described above.

Such a configuration can improve the degree of freedom of the external connecting terminals.

In an electronic device according to a ninth aspect of the present disclosure, the electronic device may further include a storage that stores information on a connection setting between the plurality of communication terminals and the plurality of external connecting terminals, wherein the connection setting may be set by a Basic Input Output System (BIOS) and stored in the storage, and the controller may control the first switch device and the second switch device based on the information on the connection setting stored in the storage.

Such a configuration allows the controller to control the first switch device and the second switch device based on the connection setting set by the BIOS.

Hereinafter, exemplary embodiments of the present disclosure will be described with reference to the accompanying drawings. In each drawing, each element is exaggerated in order to facilitate the description.

In this specification, the terms "first", "second", and the like are only used for description, and should not be understood as expressing or implying relative importance or a rank of a technical feature. Features limited to "first" and "second" are intended to express or imply the inclusion of one or more such features.

First Exemplary Embodiment

Overall Configuration of Communication Device

Figure 2:
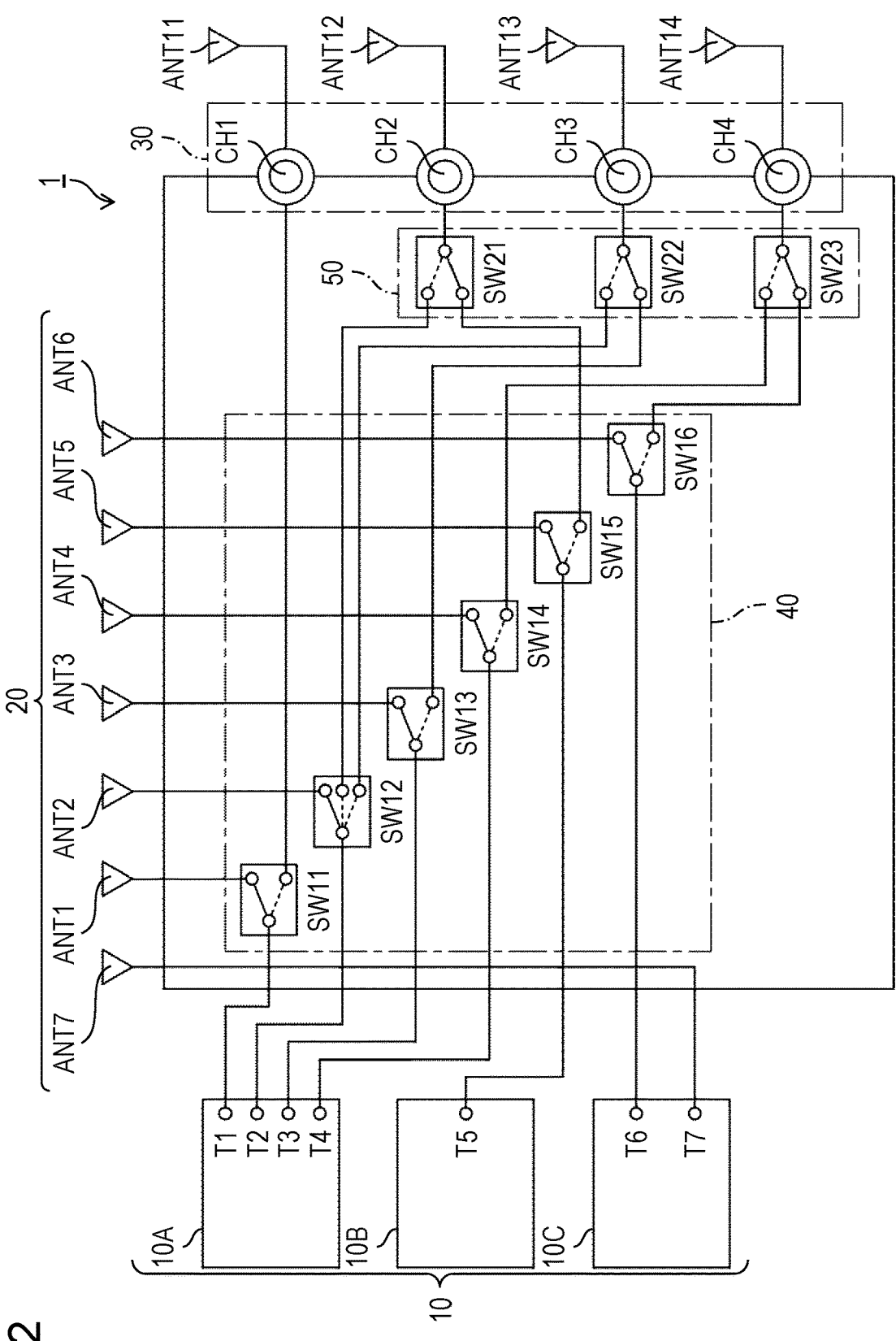
FIG. 2 is a schematic diagram illustrating an example of a circuit configuration of a communication device of the first exemplary embodiment according to the present disclosure.

FIG. 1 is a schematic block diagram illustrating an example of a configuration of communication device 1 of a first exemplary embodiment according to the present disclosure. FIG. 2 is a schematic diagram illustrating an example of a circuit configuration of communication device 1 of the first exemplary embodiment according to the present disclosure.

As illustrated in FIG. 1, communication device 1 includes communication module 10, a plurality of internal antennas 20, a plurality of external connecting terminals 30, first switch device 40, second switch device 50, and controller 60. Communication device 1 wirelessly communicates with an external device by transmitting and receiving wireless signals according to a corresponding wireless communication system of communication module 10.

Communication Module

Communication module 10 is a device that transmits and receives wireless signals. As illustrated in FIG. 2, communication module 10 includes a plurality of communication terminals T1 to T7. The plurality of communication terminals T1 to T7 are terminals that transmit and receive wireless signals. The plurality of communication terminals T1 to T7 can receive a wireless signal from the external device or transmit a wireless signal to the external device by being connected to the plurality of internal antennas 20 or the plurality of external connecting terminals 30.

In the present exemplary embodiment, communication module 10 includes three communication modules 10A to 10C having different frequency bands. That is, communication module 10 includes first communication module 10A, second communication module 10B, and third communication module 10C. Communication module 10 includes seven communication terminals T1 to T7.

In the present specification, seven communication terminals T1 to T7 may be referred to as first communication terminal T1, second communication terminal T2, third communication terminal T3, fourth communication terminal T4, fifth communication terminal T5, sixth communication terminal T6, and seventh communication terminal T7.

FIG. 3 is a table illustrating an example of a communication system and communication terminals T1 to T7 of communication module 10. As illustrated in FIG. 3, first communication module 10A corresponds to Wireless Wide Area Network (WWAN) communication. For example, first communication module 10A corresponds to a wireless signal of from 600 MHz to 6 GHz inclusive.

First communication module 10A includes four communication terminals T1 to T4 corresponding to the wireless communication system of WWAN signals. For example, first communication module 10A includes first communication terminal T1, second communication terminal T2, third communication terminal T3, and fourth communication terminal T4 that transmit and receive WWAN signals. First communication terminal T1, second communication terminal T2, third communication terminal T3, and fourth communication terminal T4 are WWAN-main terminal T1, WWAN-aux terminal T2, WWAN-3rd terminal T3, and WWAN-4th terminal T4, respectively.

Second communication terminal T2 can use both WWAN signals and WWAN-GPS signals. Second communication terminal T2 can be used by switching to one of communication systems of WWAN signals and WWAN-GPS signals. Here, the "WWAN signal" is a wireless signal in a frequency band used in WWAN communication, for example, from 600 MHz to 6 GHz inclusive. The "WWAN-GPS signal" is a global positioning system (GPS) signal in a frequency band usable in WWAN communication, for example, 1.5 GHz band.

Second communication module 10B corresponds to Global Navigation Satellite System (GNSS) signals. For example, second communication module 10B receives a GPS signal of 1575.42 MHz, a GLONASS signal of 1602 MHz, a BeiDou signal of 1561.098 MHz, and the like.

Second communication module 10B has one communication terminal T5 corresponding to the wireless communication system of GNSS signals. For example, first communication module 10A includes fifth communication terminal T5 that receives a GNSS signal. Fifth communication terminal T5 is RF terminal T5.

Third communication module 10C corresponds to Wireless Local Area Network (WLAN) communication. For example, third communication module 10C corresponds to a wireless signal of 2.4 GHz band or 5 GHz band.

Third communication module 10C includes two communication terminals T6 and T7 corresponding to the wireless communication system of WLAN signals. For example, third communication module 10C includes sixth communication terminal T6 and seventh communication terminal T7 that transmit and receive WLAN signals. Sixth communication terminal T6 and seventh communication terminal T7 are WLAN-main terminal T6 and WLAN-aux terminal T7. WLAN-aux terminal T7 can also correspond to Bluetooth signals.

Plurality of Internal Antennas

The plurality of internal antennas 20 are disposed so as to be connectable to the plurality of communication terminals T1 to T7. The plurality of internal antennas 20 are disposed inside an electronic device in which communication device 1 is housed. The plurality of internal antennas 20 radiate wireless signals toward and receive wireless signals from an external device.

As illustrated in FIG. 2, the plurality of internal antennas 20 are connected to the plurality of communication terminals T1 to T7 via wirings. In the present exemplary embodiment, the plurality of internal antennas 20 include seven internal antennas ANT1 to ANT7. Seven internal antennas ANT1 to ANT7 are disposed so as to be connectable to seven communication terminals T1 to T7 via a wiring.

The plurality of internal antennas 20 are connected to the plurality of communication terminals T1 to T7 via first switch device 40. Connection between the plurality of internal antennas 20 and the plurality of communication terminals T1 to T7 is controlled by switching of first switch device 40.

In the present exemplary embodiment, as illustrated in FIG. 2, six internal antennas ANT1 to ANT6 are connected to six communication terminals T1 to T6 via first switch device 40, and one internal antenna ANT7 is directly connected to one communication terminal T7 via wirings without passing through first switch device 40.

In this specification, seven internal antennas ANT1 to ANT7 may be referred to as first internal antenna ANT1, second internal antenna ANT2, third internal antenna ANT3, fourth internal antenna ANT4, fifth internal antenna ANT5, sixth internal antenna ANT6, and seventh internal antenna ANT7.

Plurality of External Connecting Terminals

The plurality of external connecting terminals 30 are disposed so as to be connectable to the plurality of communication terminals T1 to T7. The plurality of external connecting terminals 30 are terminals connected to the plurality of external antennas ANT11 to ANT14. The plurality of external antennas ANT11 to ANT14 include, for example, a 5G/LTE external antenna, a GPS external antenna, and a Wi-Fi external antenna. The plurality of external connecting terminals 30 are connected to the plurality of external antennas ANT11 to ANT14 to radiate wireless signals toward the external device and receive wireless signals from the external device.

As illustrated in FIG. 2, the plurality of external connecting terminals 30 are connected to the plurality of communication terminals T1 to T7 via wirings. In the present exemplary embodiment, the plurality of external connecting terminals 30 include four external connecting terminals CH1 to CH4. Four external connecting terminals CH1 to CH4 are disposed so as to be connectable to six communication terminals T1 to T6 via wirings.

The plurality of external connecting terminals 30 are connected to the plurality of communication terminals T1 to T6 via first switch device 40 and second switch device 50. Connection between the plurality of external connecting terminals 30 and the plurality of communication terminals T1 to T6 is controlled by switching between first switch device 40 and second switch device 50.

In the present exemplary embodiment, as illustrated in FIG. 2, one external connecting terminal CH1 is connected to one communication terminal T1 via first switch device 40, and three external connecting terminals CH2 to CH4 are connected to five communication terminals T2 to T6 via first switch device 40 and second switch device 50.

In the present specification, four external connecting terminals CH1 to CH4 may be referred to as first external connecting terminal CH1, second external connecting terminal CH2, third external connecting terminal CH3, and fourth external connecting terminal CH4.

First Switch Device

First switch device 40 is disposed between the plurality of communication terminals T1 to T6 and the plurality of internal antennas 20, and switches connection destinations of the plurality of communication terminals T1 to T6 to the plurality of internal antennas 20 or the plurality of external connecting terminals 30. That is, first switch device 40 switches between a first connection that connects the plurality of communication terminals T1 to T6 and the plurality of internal antennas 20 and a second connection that connects the plurality of communication terminals T1 to T6 and the plurality of external connecting terminals 30.

First switch device 40 includes a plurality of first switches SW11 to SW16. The plurality of first switches SW11 to SW16 are disposed between the plurality of communication terminals T1 to T6 and the plurality of internal antennas ANT1 to ANT6, respectively.

In the present exemplary embodiment, as illustrated in FIG. 2, six first switches SW11 to SW16 are disposed between six communication terminals T1 to T6 and six internal antennas ANT1 to ANT6.

In the present specification, six first switches SW11 to SW16 may be referred to as first internal connection selection switch SW11, second internal connection selection switch SW12, third internal connection selection switch SW13, fourth internal connection selection switch SW14, fifth internal connection selection switch SW15, and sixth internal connection selection switch SW16.

First internal connection selection switch SW11 is disposed between first communication terminal T1 and first internal antenna ANT1, and switches the connection destination of first communication terminal T1 to first internal antenna ANT1 or first external connecting terminal CH1. Specifically, first internal connection selection switch SW11 is connected to first internal antenna ANT1 and first external connecting terminal CH1 via two wirings. First internal connection selection switch SW11 selects either the wiring connected to first internal antenna ANT1 or the wiring connected to first external connecting terminal CH1.

Second internal connection selection switch SW12 is disposed between second communication terminal T2 and second internal antenna ANT2, and switches the connection destination of second communication terminal T2 to second internal antenna ANT2, second external connecting terminal CH2, or third external connecting terminal CH3. Specifically, second internal connection selection switch SW12 is connected to second internal antenna ANT2, second external connecting terminal CH2, and third external connecting terminal CH3 via three wirings. Second internal connection selection switch SW12 selects one of the wiring connected to first internal antenna ANT1, the wiring connected to second external connecting terminal CH2, and the wiring connected to third external connecting terminal CH3. Second switch device 50 is disposed on the wiring connected to second external connecting terminal CH2 and the wiring connected to third external connecting terminal CH3, and the connection destination of second communication terminal T2 is controlled by second switch device 50.

Third internal connection selection switch SW13 is disposed between third communication terminal T3 and third internal antenna ANT3, and switches the connection destination of third communication terminal T3 to third internal antenna ANT3 or third external connecting terminal CH3. Specifically, third internal connection selection switch SW13 is connected to third internal antenna ANT3 and third external connecting terminal CH3 via two wirings. Third internal connection selection switch SW13 selects either the wiring connected to third internal antenna ANT3 or the wiring connected to third external connecting terminal CH3. Second switch device 50 is disposed on the wiring connected to third external connecting terminal CH3, and the connection destination of third communication terminal T3 is controlled by second switch device 50.

Fourth internal connection selection switch SW14 is disposed between fourth communication terminal T4 and fourth internal antenna ANT4, and switches the connection destination of fourth communication terminal T4 to fourth internal antenna ANT4 or fourth external connecting terminal CH4. Specifically, fourth internal connection selection switch SW14 is connected to fourth internal antenna ANT4 and fourth external connecting terminal CH4 via two wirings. Fourth internal connection selection switch SW14 selects either the wiring connected to fourth internal antenna ANT4 or the wiring connected to fourth external connecting terminal CH4. Second switch device 50 is disposed on the wiring connected to fourth external connecting terminal CH4, and the connection destination of fourth communication terminal T4 is controlled by second switch device 50.

Fifth internal connection selection switch SW15 is disposed between fifth communication terminal T5 and fifth internal antenna ANT5, and switches the connection destination of fifth communication terminal T5 to fifth internal antenna ANT5 or second external connecting terminal CH2. Specifically, fifth internal connection selection switch SW15 is connected to fifth internal antenna ANT5 and second external connecting terminal CH2 via two wirings. Fifth internal connection selection switch SW15 selects either the wiring connected to fifth internal antenna ANT5 or the wiring connected to second external connecting terminal CH2. Second switch device 50 is disposed on the wiring connected to second external connecting terminal CH2, and the connection destination of fifth communication terminal T5 is controlled by second switch device 50.

Sixth internal connection selection switch SW16 is disposed between sixth communication terminal T6 and sixth internal antenna ANT6, and switches the connection destination of sixth communication terminal T6 to sixth internal antenna ANT6 or fourth external connecting terminal CH4. Specifically, sixth internal connection selection switch SW16 is connected to sixth internal antenna ANT6 and fourth external connecting terminal CH4 via two wirings. Sixth internal connection selection switch SW16 selects either the wiring connected to sixth internal antenna ANT6 and the wiring connected to fourth external connecting terminal CH4. Second switch device 50 is disposed on the wiring connected to fourth external connecting terminal CH4, and the connection destination of sixth communication terminal T6 is controlled by second switch device 50.

The plurality of first switches SW11 to SW16 constituting first switch device 40 include, for example, a Single-Pole Double-Throw (SPDT) switch or a Single-Pole 3-Throw (SP3T) switch dedicated to radio frequency (RF) of GaAsM-MIC. The plurality of first switches SW11 to SW16 are not limited to these switches, and may be relays or semiconductor switches such as MOSFETs and IGBTs.

Second Switch Device

Second switch device 50 is disposed between first switch device 40 and the plurality of external connecting terminals 30, selects one or more communication terminals T2 to T4 from the plurality of communication terminals T2 to T6 connected to first switch device 40, and connects to one or more external connecting terminals CH2 to CH4 from the plurality of external connecting terminals 30. Second switch device 50 is connected to first switch device 40 and the plurality of external connecting terminals 30 via wirings.

Second switch device 50 selects connection destinations of the plurality of external connecting terminals CH2 to CH4 from the plurality of first switches SW11 to SW16.

Second switch device 50 includes a plurality of second switches SW21 to SW23. The plurality of second switches SW21 to SW23 are disposed between first switch device 40 and the plurality of external connecting terminals CH2 to CH4.

In the present exemplary embodiment, as illustrated in FIG. 2, three second switches SW21 to SW23 are disposed between five first switches SW12 to SW16 and three external connecting terminals CH2 to CH4.

Each of the plurality of second switches SW21 to SW23 is connected in series to two or more first switches among the plurality of first switches SW11 to SW16.

In the present specification, three second switches SW21 to SW23 may be referred to as first external connection selection switch SW21, second external connection selection switch SW22, and third external connection selection switch SW23.

First external connection selection switch SW21 is connected in series to second internal connection selection switch SW12 and fifth internal connection selection switch SW15. First external connection selection switch SW21 selects either second communication terminal T2 connected to second internal connection selection switch SW12 or fifth communication terminal T5 connected to fifth internal connection selection switch SW15. First external connection selection switch SW21 connects the selected one of second communication terminal T2 and fifth communication terminal T5 to second external connecting terminal CH2. Specifically, first external connection selection switch SW21 is connected in series to second internal connection selection switch SW12 and fifth internal connection selection switch SW15 via two wirings. First external connection selection switch SW21 selects either the wiring connected to second internal connection selection switch SW12 or the wiring connected to fifth internal connection selection switch SW15.

Second external connection selection switch SW22 is connected in series to second internal connection selection switch SW12 and third internal connection selection switch SW13. Second external connection selection switch SW22 selects either second communication terminal T2 connected to second internal connection selection switch SW12 or third communication terminal T3 connected to third internal connection selection switch SW13. Second external connection selection switch SW22 connects the selected second communication terminal T2 or third communication terminal T3 to third external connecting terminal CH3. Specifically, second external connection selection switch SW22 is connected in series to second internal connection selection switch SW12 and third internal connection selection switch SW13 via two wirings. Second external connection selection switch SW22 selects either the wiring connected to second internal connection selection switch SW12 or the wiring connected to third internal connection selection switch SW13.

Third external connection selection switch SW23 is connected in series to fourth internal connection selection switch SW14 and sixth internal connection selection switch SW16. Third external connection selection switch SW23 selects either fourth communication terminal T4 connected to fourth internal connection selection switch SW14 or sixth communication terminal T6 connected to sixth internal connection selection switch SW16. Third external connection selection switch SW23 connects the selected fourth communication terminal T4 or sixth communication terminal T6 to third external connecting terminal CH3. Specifically, third external connection selection switch SW23 is connected in series to fourth internal connection selection switch SW14 and sixth internal connection selection switch SW16 via two wirings. Third external connection selection switch SW23 selects either the wiring connected to fourth internal connection selection switch SW14 or the wiring connected to sixth internal connection selection switch SW16.

The plurality of second switches SW21 to SW23 constituting second switch device 50 include, for example, a Single-Pole Double-Throw (SPDT) switch or a Single-Pole 3-Throw (SP3T) switch dedicated to radio frequency (RF) of GaAsMMIC. The plurality of first switches SW11 to SW16 are not limited to these switches, and may be relays or semiconductor switches such as MOSFETs and IGBTs.

FIG. 4 is a table illustrating an example of a connection setting of the plurality of communication terminals T1 to T7, the plurality of internal antennas 20, and the plurality of external connecting terminals 30. As illustrated in FIG. 4, in the present exemplary embodiment, in the plurality of internal antennas 20, first internal antenna ANT1 is set to either first communication terminal T1 or "None". Second internal antenna ANT2 is set to either second communication terminal T2 or "None". Third internal antenna ANT3 is set to either third communication terminal T3 or "None". Fourth internal antenna ANT4 is set to either fourth communication terminal T4 or "None". Fifth internal antenna ANT5 is set to either fifth communication terminal T5 or "None". Sixth internal antenna ANT6 is set to either sixth communication terminal T6 or "None". Seventh internal antenna ANT7 is set as seventh communication terminal T7.

In the present exemplary embodiment, first external connecting terminal CH1 is set to either first communication terminal T1 or "None". Second external connecting terminal CH2 is set to any one of second communication terminal T2, fifth communication terminal T5, and "None". Third external connecting terminal CH3 is set to one of second communication terminal T2, third communication terminal T3, and "None". Fourth external connecting terminal CH4 is set to any one of fourth communication terminal T4, sixth communication terminal T6, and "None".

In the present specification, "None" means a state in which no communication terminal is connected. For example, when first communication terminal T1 is connected to first internal antenna ANT1, first external connecting terminal CH1 becomes "None" which is a state of not being connected to first communication terminal T1.

Controller

As illustrated in FIG. 1, controller 60 controls first switch device 40 and second switch device 50. Specifically, controller 60 controls switching of the plurality of first switches SW11 to SW16 and switching of the plurality of second switches SW21 to SW23. For example, controller 60 reads the information on the connection setting stored in a storage of the electronic device, and controls switching of the plurality of first switches SW11 to SW16 and switching of the plurality of second switches SW21 to SW23 based on the information on the connection setting.

The connection setting may be a preset connection setting or a connection setting set by a user. Alternatively, the connection setting may be a setting in which a communication system of an external antenna connected to the plurality of external connecting terminals 30 is detected, and a communication terminal corresponding to the detected communication system is automatically connected.

Controller 60 can be realized by a semiconductor device or the like. For example, controller 60 can include a microcomputer, a central processing unit (CPU), a micro processing unit (MPU), a graphics processing unit (GPU), a digital signal processor (DSP), a field programmable gate array (FPGA), or an application specific integrated circuit (ASIC). Functions of controller 60 may be configured only by hardware, or may be realized by a combination of the hardware and software.

Controller 60 realizes predetermined functions by reading out data and programs stored in a storage to perform various arithmetic processing.

Specific Configuration of Communication Device

Figure 5:
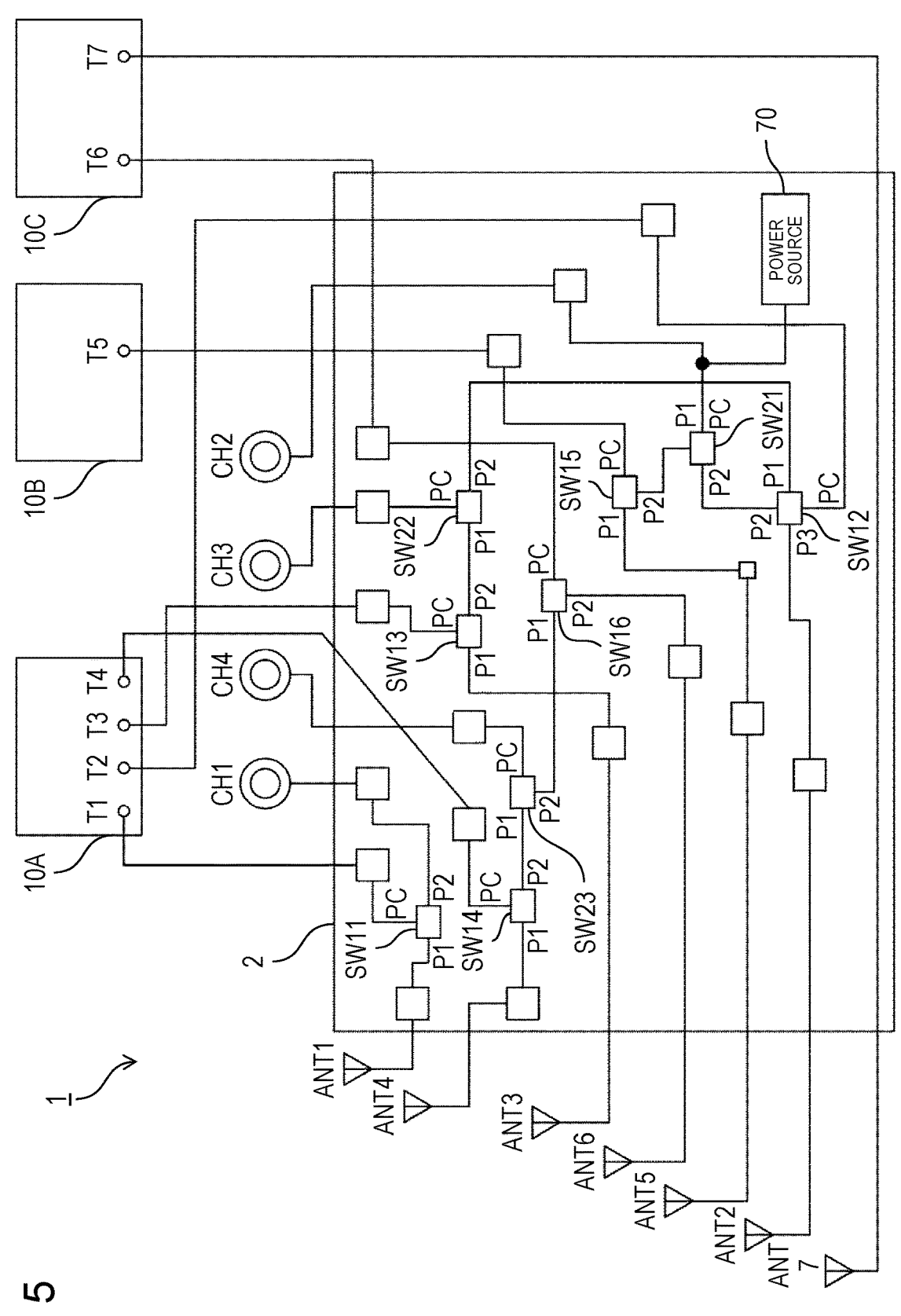
FIG. 5 is a schematic diagram illustrating an example of a specific configuration of the communication device of the first exemplary embodiment according to the present disclosure.

FIG. 5 is a schematic diagram illustrating an example of a specific configuration of communication device 1 of the first exemplary embodiment according to the present disclosure.

As illustrated in FIG. 5, the plurality of first switches SW11 to SW16 and the plurality of second switches SW21 to SW23 are switched to first path PC-P1, second path PC-P2, or third path PC-P3. Specifically, first and third to sixth internal connection selection switches SW11, SW13 to SW16 and first to third external connection selection switches SW21 to SW23 switch to first path PC-P1 or second path PC-P2. Second internal connection selection switch SW12 switches to first path PC-P1, second path PC-P2, or third path PC-P3. As described above, the plurality of first switches SW11 to SW16 and the plurality of second switches SW21 to SW23 change the connection destinations of the plurality of communication terminals T1 to T6 by switching the plurality of paths.

As an example, first internal connection selection switch SW11 connects first communication terminal T1 and first internal antenna ANT1 when switching to first path PC-P1, and connects first communication terminal T1 and first external connecting terminal CH1 when switching to second path PC-P2.

As an example, second internal connection selection switch SW12 connects second communication terminal T2 and second external connection selection switch SW22 when switching to first path PC-P1. Second internal connection selection switch SW12 connects second communication terminal T2 and first external connection selection switch SW21 when switching to second path PC-P2. Second internal connection selection switch SW12 connects second communication terminal T2 and second internal antenna ANT2 when switching to third path PC-P3.

Communication device 1 includes power source 70. Power source 70 is connected to the wiring between second external connection selection switch SW22 and second external connecting terminal CH2. Power source 70 applies, for example, a voltage of 5 V to second external connecting terminal CH2. The voltage applied to second external connecting terminal CH2 is used as a driving voltage of an external device, for example, an external GPS, connected to second external connecting terminal CH2.

For example, when second communication terminal T2 is used in the communication system of WWAN-GPS signals and second communication terminal T2 is connected to second external connecting terminal CH2, power source 70 applies a voltage to second external connecting terminal CH2. Alternatively, when fifth communication terminal T5 that receives GNSS signals is connected to second external connecting terminal CH2, power source 70 applies a voltage to second external connecting terminal CH2.

In the present exemplary embodiment, first switch device 40, second switch device 50, and the wiring constituting communication device 1 are provided on one substrate 2. That is, communication device 1 does not need to use a plurality of substrates, and can be realized by using one substrate 2.

Controller 60 controls switching of first path PC-P1, second path PC-P2, or third path PC-P3 in the plurality of first switches SW11 to SW16 and the plurality of second switches SW21 to SW23 by a control signal of "0" or "1".

FIG. 6 is a table illustrating an example of control signals for controlling first switch device 40 and second switch device 50. As illustrated in FIG. 6, controller 60 controls the plurality of first switches SW11 to SW16, the plurality of second switches SW21 to SW23, and power source 70 using 14 control signals CS11, CS21 to CS24, CS31, CS36, CS41 to 43, and CS5V.

As an example, controller 60 controls first internal connection selection switch SW11 using control signal CS11. Controller 60 controls switching of first internal connection selection switch SW11 by inputting control signal CS11 of "0" or "1". Specifically, when controller 60 inputs control signal CS11 of "0", first internal connection selection switch SW11 is switched to first path PC-P1. When controller 60 inputs control signal CS11 of "1", first internal connection selection switch SW11 is switched to second path PC-P2.

As an example, controller 60 controls second internal connection selection switch SW12 using control signals CS21, CS22, CS23. Controller 60 controls switching of second internal connection selection switch SW12 by inputting control signals CS21, CS22, CS23 of "0" or "1". Specifically, when controller 60 inputs control signals CS21, CS22, CS23 of "1/0/0", second internal connection selection switch SW12 is switched to first path PC-P1. When controller 60 inputs control signals CS21, CS22, CS23 of "0/1/0", second internal connection selection switch SW12 is switched to second path PC-P2. When controller 60 inputs control signals CS21, CS22, CS23 of "0/0/1", second internal connection selection switch SW12 is switched to third path PC-P3.

As an example, controller 60 controls power source 70 using control signal CS5V. Controller 60 controls the application of the voltage of power source 70 by inputting control signal CS5V of "0" or "1". Specifically, when controller 60 inputs control signal CS5V of "0", power source 70 is turned off and no voltage is applied. When controller 60 inputs control signal CS5V of "1", power source 70 is turned on and a voltage is applied.

Example 1

Figure 7:
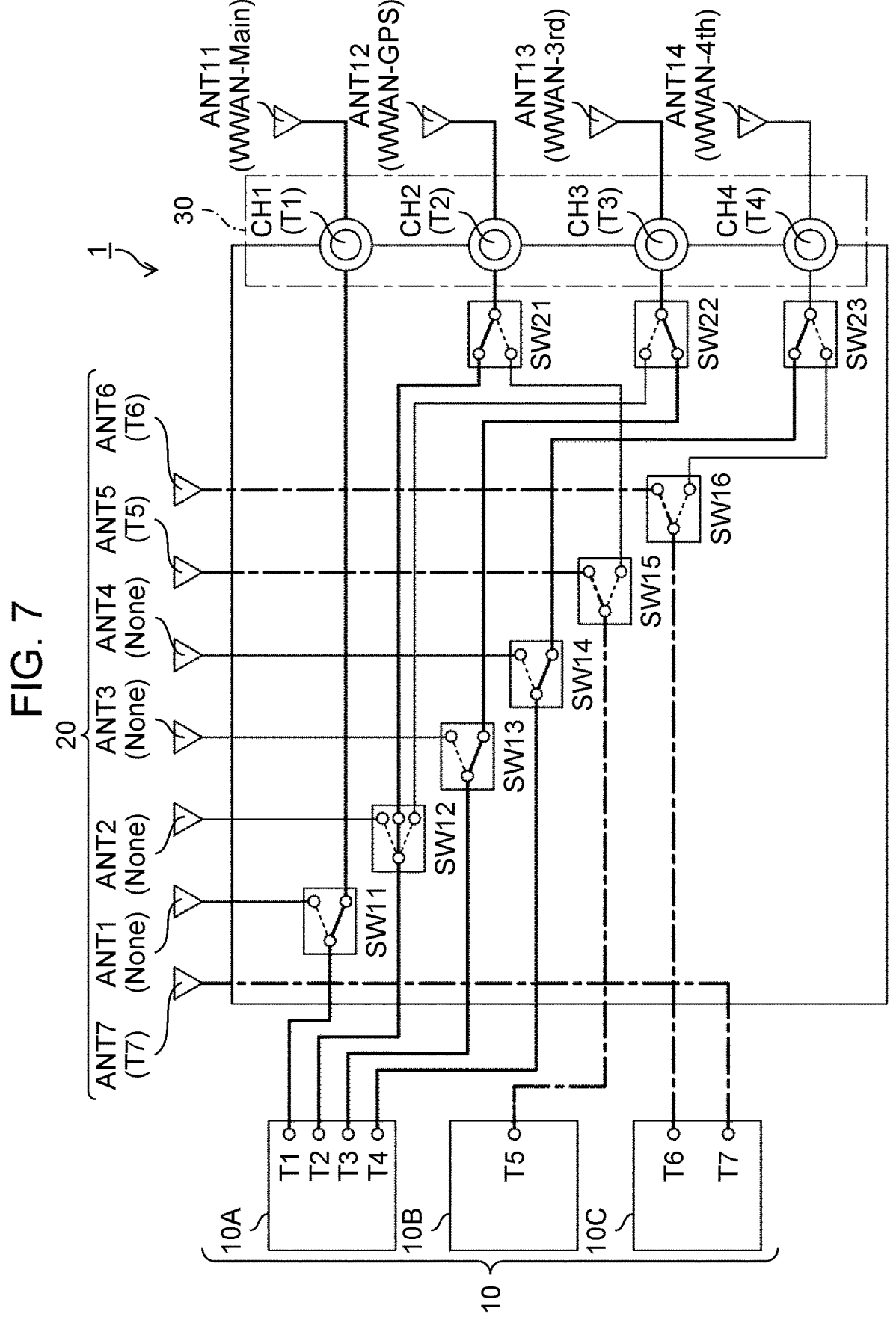
FIG. 7 is a schematic diagram illustrating Example 1 of the communication device.

FIG. 7 is a schematic diagram illustrating Example 1 of communication device 1. FIG. 8 is a table illustrating an example of the control signals in Example 1 illustrated in FIG. 7. In FIG. 7, a line indicated by a solid line indicates connection to external connecting terminal 30, and a line indicated by a one-dot chain line indicates connection to internal antenna 20.

As illustrated in FIG. 7, in Example 1, first external connecting terminal CH1 is connected to first communication terminal T1, second external connecting terminal CH2 is connected to second communication terminal T2, third external connecting terminal CH3 is connected to third communication terminal T3, and fourth external connecting terminal CH4 is connected to fourth communication terminal T4. First to fourth internal antennas ANT1 to ANT4 are "None". Fifth internal antenna ANT5 is connected to fifth communication terminal T5, sixth internal antenna ANT6 is connected to sixth communication terminal T6, and seventh internal antenna ANT7 is connected to seventh communication terminal T7.

First communication terminal T1 is a WWAN-main terminal, second communication terminal T2 is a WWAN-aux terminal, third communication terminal T3 is a WWAN-3rd terminal, and fourth communication terminal T4 is a WWAN-4th terminal. Fifth communication terminal T5 is an RF terminal, sixth communication terminal T6 is a WLAN-main terminal, and seventh communication terminal T7 is a WLAN-aux terminal (see FIG. 3). Second communication terminal T2 receives WWAN-GPS signals.

For example, in Example 1, an external antenna that transmits and receives WWAN signals can be connected to first external connecting terminal CH1, third external connecting terminal CH3, and fourth external connecting terminal CH4. An external GPS that receives WWAN-GPS signals can be connected to second external connecting terminal CH2.

In Example 1, controller 60 controls the plurality of first switches SW11 to SW16, the plurality of second switches SW21 to SW23, and power source 70 using CS11, CS21 to CS24, CS31, CS36, CS41 to 43, CS5V using the control signals illustrated in FIG. 8.

In Example 1, second communication terminal T2 is used in the communication system of WWAN-GPS signals, and is connected to second external connecting terminal CH2. In this case, controller 60 does not connect second communication terminal T2 and third external connecting terminal CH3 in second external connection selection switch SW22. In this manner, when second communication terminal T2 is connected to second external connecting terminal CH2, controller 60 performs exclusive processing so as not to connect second communication terminal T2 and third external connecting terminal CH3 in second external connection selection switch SW22.

When second communication terminal T2 is used in the communication system of WWAN signals and is connected to third external connecting terminal CH3, controller 60 performs exclusive processing so as not to connect second communication terminal T2 and second external connecting terminal CH2 in first external connection selection switch SW21.

Example 2

Figure 9:
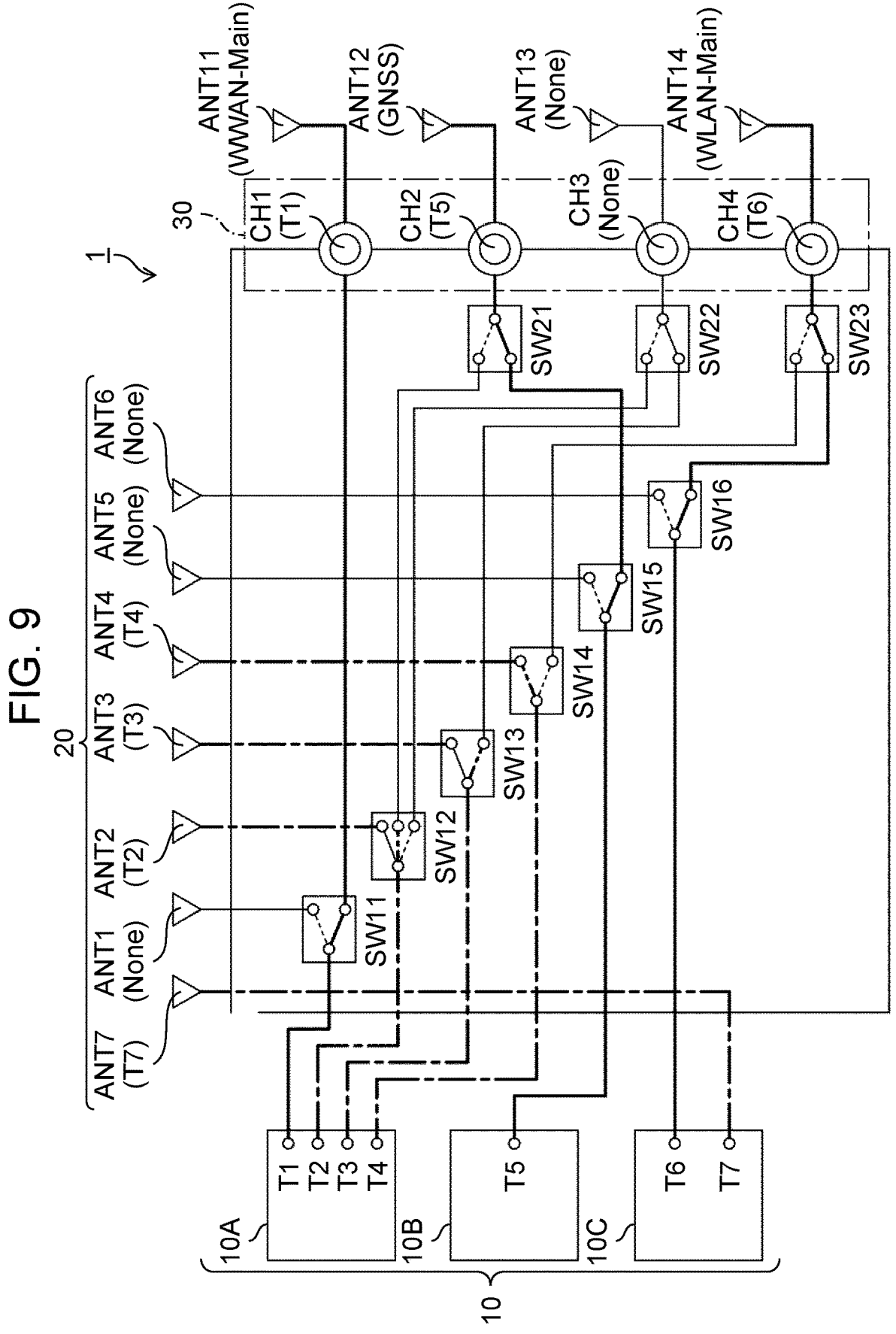
FIG. 9 is a schematic diagram illustrating Example 2 of the communication device.

FIG. 9 is a schematic diagram illustrating Example 2 of communication device 1. FIG. 10 is a table illustrating an example of the control signals in Example 2 illustrated in FIG. 9. In FIG. 9, a line indicated by a solid line indicates connection to external connecting terminal 30, and a line indicated by a one-dot chain line indicates connection to internal antenna 20.

As illustrated in FIG. 9, in Example 2, first external connecting terminal CH1 is connected to first communication terminal T1, second external connecting terminal CH2 is connected to fifth communication terminal T5, third external connecting terminal CH3 is becomes None, fourth external connecting terminal CH4 is connected to sixth communication terminal T6. First internal antennas ANT1 is "None". Second internal antenna ANT2 is connected to second communication terminal T2, third internal antenna ANT3 is connected to third communication terminal T3, and fourth internal antenna ANT4 is connected to fourth communication terminal T4. Fifth and sixth internal antennas ANT5 and ANT6 are "None", and seventh internal antenna ANT7 is connected to seventh communication terminal T7.

For example, in Example 1, an external antenna that transmits and receives WWAN signals can be connected to first external connecting terminal CH1. An external GNSS that receives GNSS signals can be connected to second external connecting terminal CH2. No external device is connected to third external connecting terminal CH3. An external antenna that transmits and receives WLAN signals can be connected to fourth external connecting terminal CH4.

In Example 2, controller 60 controls the plurality of first switches SW11 to SW16, the plurality of second switches SW21 to SW23, and power source 70 using CS11, CS21 to CS24, CS31, CS36, CS41 to 43, CS5V using the control signals illustrated in FIG. 10.

In Example 2, when third external connecting terminal CH3 is "None", controller 60 controls second internal connection selection switch SW12 and second external connection switch SW22 so as not to connect second communication terminal T2 and third external connecting terminal CH3.

Example 3

Figure 11:
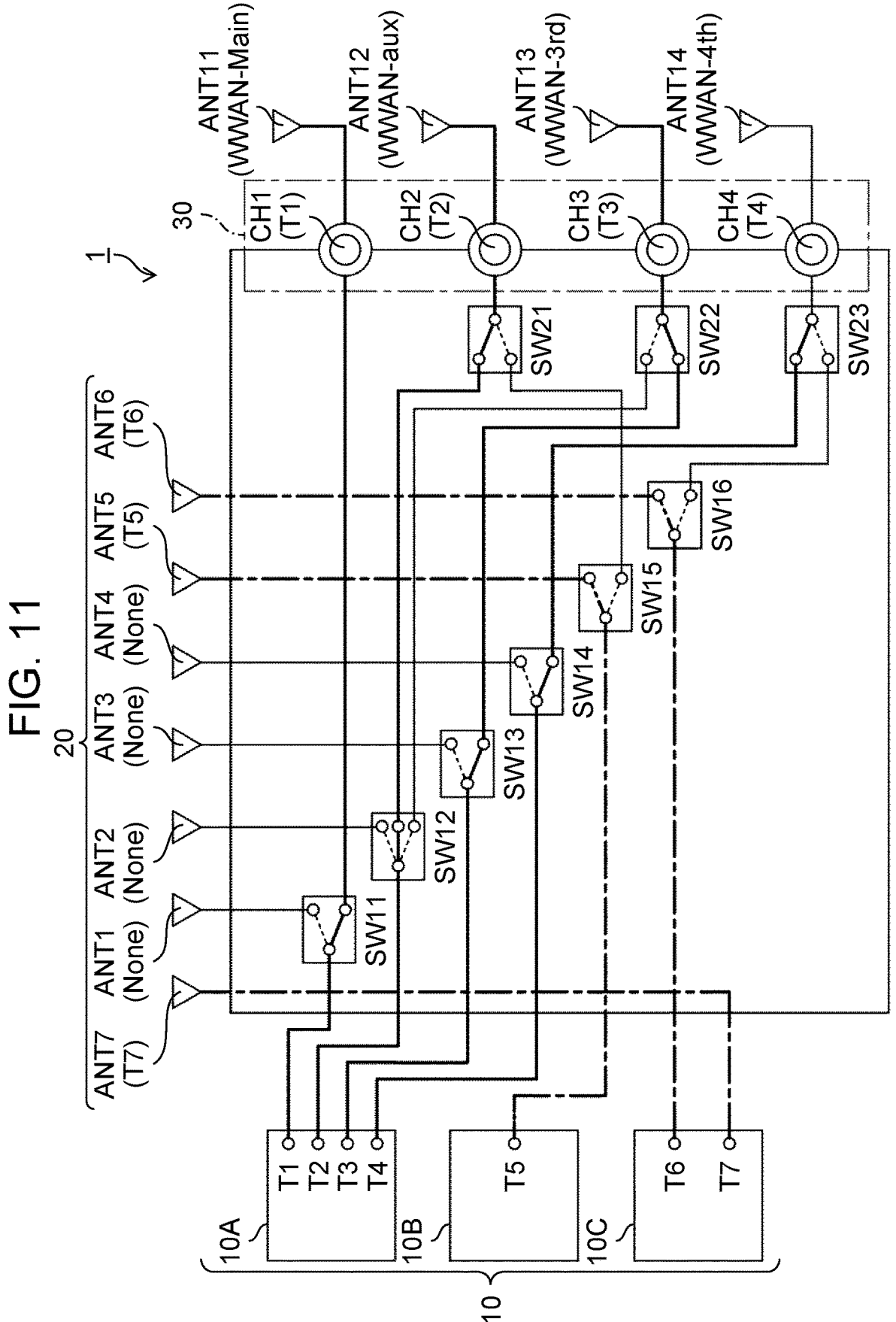
FIG. 11 is a schematic diagram illustrating Example 3 of the communication device.

FIG. 11 is a schematic diagram illustrating Example 3 of communication device 1. FIG. 12 is a table illustrating an example of the control signals in Example 3 illustrated in FIG. 11. In FIG. 11, a line indicated by a solid line indicates connection to external connecting terminal 30, and a line indicated by a one-dot chain line indicates connection to internal antenna 20.

As illustrated in FIG. 11, first external connecting terminal CH1 is connected to first communication terminal T1, second external connecting terminal CH2 is connected to second communication terminal T2, third external connecting terminal CH3 is connected to third communication terminal T3, and fourth external connecting terminal CH4 is connected to fourth communication terminal T4. First to fourth internal antennas ANT1 to ANT4 are "None". Fifth internal antenna ANT5 is connected to fifth communication terminal T5, sixth internal antenna ANT6 is connected to sixth communication terminal T6, and seventh internal antenna ANT7 is connected to seventh communication terminal T7.

First communication terminal T1 is a WWAN-main terminal, second communication terminal T2 is a WWAN-aux terminal, third communication terminal T3 is a WWAN-3rd terminal, and fourth communication terminal T4 is a WWAN-4th terminal. Fifth communication terminal T5 is an RF terminal, sixth communication terminal T6 is a WLAN-main terminal, and seventh communication terminal T7 is a WLAN-aux terminal (see FIG. 3). Second communication terminal T2 receives WWAN-aux signals.

For example, in Example 3, an external antenna that transmits and receives WWAN signals can be connected to first to fourth external connecting terminals CH1 to CH4.

In Example 3, controller 60 controls the plurality of first switches SW11 to SW16, the plurality of second switches SW21 to SW23, and power source 70 using CS11, CS21 to CS24, CS31, CS36, CS41 to 43, CS5V using the control signals illustrated in FIG. 12.

In Example 3, since an external GPS antenna is not connected, CS5V is turned off.

In Example 3, high-speed communication is possible by performing Multiple-Input and Multiple-Output (MIMO) communication.

Effects

According to communication device 1 of the first exemplary embodiment, the following effects can be obtained.

Communication device 1 includes communication module 10, a plurality of internal antennas 20, a plurality of external connecting terminals 30, first switch device 40, second switch device 50, and controller 60. Communication module 10 includes a plurality of communication terminals T1 to T7. The plurality of internal antennas 20 are disposed so as to be connectable to the plurality of communication terminals T1 to T7. The plurality of external connecting terminals 30 are disposed so as to be connectable to the plurality of communication terminals T1 to T7. First switch device 40 is disposed between the plurality of communication terminals T1 to T6 and the plurality of internal antennas 20, and switches connection destinations of the plurality of communication terminals T1 to T6 to the plurality of internal antennas 20 or the plurality of external connecting terminals 30. Second switch device 50 is disposed between first switch device 40 and the plurality of external connecting terminals 30, selects one or more communication terminals T2 to T6 among the plurality of communication terminals T1 to T6 connected to first switch device 40, and connects to one or more external connecting terminals CH2 to CH3 among the plurality of external connecting terminals 30. Controller 60 controls first switch device 40 and second switch device 50.

Such a configuration can improve the degree of freedom of the external connecting terminals. According to communication device 1, controller 60 controls first switch device 40 and second switch device 50, and thus connection destinations of the plurality of communication terminals T1 to T6 can be selected from the plurality of external connecting terminals 30. Thus, it is possible to increase variations in connection between the plurality of external connecting terminals 30 and the plurality of communication terminals T1 to T6.

For example, when communication device 1 includes the plurality of communication modules 10A to 10C having different communication systems, the corresponding communication scheme can be switched by switching the connection with the plurality of communication terminals T2 to T6 in one external connecting terminal 30.

Further, according to communication device 1, the device configuration can be simplified. Specifically, according to communication device 1, the number of electronic components such as substrates to be prepared can be reduced as compared with a configuration in which a plurality of external connecting terminals are connected to a plurality of communication terminals in a one-to-one relationship. For example, according to communication device 1, even when a plurality of communication modules 10A to 10C having different communication systems is used, first switch device 40, second switch device 50, power source 70, and various wirings can be mounted on one substrate. Such a configuration can downsize communication device 1.

In addition, the number of external connecting terminals 30 can be reduced in communication device 1 as compared with a configuration in which a plurality of external connecting terminals are connected to a plurality of communication terminals in a one-to-one relationship. For example, it is required to increase the number of external antennas to correspond to 5G. According to communication device 1, since one external connecting terminal 30 can correspond to a plurality of communication systems, an increase in the number of external connecting terminals 30 can be suppressed. In this manner, according to communication device 1, it is possible to correspond to various communication systems while suppressing an increase in the number of external connecting terminals 30 as compared with a configuration in which a plurality of external connecting terminals are connected to a plurality of communication terminals in a one-to-one relationship.

First switch device 40 includes a plurality of first switches SW11 to SW16 disposed between the plurality of communication terminals T1 to T6 and the plurality of internal antennas 20. Second switch device 50 includes a plurality of second switches SW21 to SW23 disposed between the plurality of first switches SW11 to SW16 and the plurality of external connecting terminals 30. Each of the plurality of second switches SW21 to SW23 is connected in series to two or more first switches among the plurality of first switches SW11 to SW16. Such a configuration can further improve the degree of freedom of the external connecting terminals.

Communication module 10 includes at least one of first communication module 10A, second communication module 10B, and third communication module 10C. First communication module 10A corresponds to WWAN communication. Second communication module 10B receives GNSS signals. Third communication module 10C corresponds to WLAN communication. With such a configuration, the communication system of the plurality of external connecting terminals 30 can be made to correspond to WWAN signals, GNSS signals, or WLAN signals. For example, a certain external connecting terminal 30 can correspond to two communication systems of WWAN signals and GNSS signals, and another external connecting terminal 30 can correspond to two communication systems of WWAN signals and WLAN signals.

The plurality of external connecting terminals 30 include first external connecting terminal CH1, second external connecting terminal CH2, third external connecting terminal CH3, and fourth external connecting terminal CH4. First communication module 10A includes first communication terminal T1, second communication terminal T2, third communication terminal T3, and fourth communication terminal T4 that transmit and receive WWAN signals. Second communication module 10B includes fifth communication terminal T5 that receives GNSS signals. Third communication module 10C includes sixth communication terminal T6 and seventh communication terminal T7 that transmit and receive WLAN signals. First external connecting terminal CH1 is connected to first communication terminal T1. Second switch device 50 includes first external connection selection switch SW21, second external connection selection switch SW22, and third external connection selection switch SW23. First external connection selection switch SW21 selects either second communication terminal T2 or fifth communication terminal T5, and connects the selected second communication terminal T2 or fifth communication terminal T5 to second external connecting terminal CH2. Second external connection selection switch SW22 selects either second communication terminal T2 or third communication terminal T3, and connects the selected second communication terminal T2 or third communication terminal T3 to third external connecting terminal CH3. Third external connection selection switch SW23 selects either fourth communication terminal T4 or sixth communication terminal T6, and connects the selected fourth communication terminal T4 or sixth communication terminal T6 to fourth external connecting terminal CH4. Such a configuration can further improve the degree of freedom of the external connecting terminals.

Second communication terminal T2 corresponds to WWAN signals and WWAN-GPS signals. When first external connection selection switch SW21 connects second communication terminal T2 and second external connecting terminal CH2, controller 60 does not connect second communication terminal T2 and third external connecting terminal CH3 in second external connection selection switch SW22. When second external connection selection switch SW22 connects second communication terminal T2 and third external connecting terminal CH3, controller 60 does not connect second communication terminal T2 and second external connecting terminal CH2 in first external connection selection switch SW21. With such a configuration, controller 60 can efficiently control first switch device 40 and second switch device 50. Performing such exclusion processing can reduce the control signals for controlling first switch device 40 and second switch device 50 in controller 60.

In the present exemplary embodiment, an example has been described in which communication device 1 includes three communication modules 10A, 10B, 10C, seven internal antennas ANT1 to ANT7, and four external connecting terminals CH1 to CH4, but the present invention is not limited to this configuration.

For example, communication device 1 may include at least one or more communication modules. For example, communication device 1 may include first communication module 10A without including second communication module 10B and third communication module 10C.

For example, the number of internal antennas 20 and the number of external connecting terminals 30 may be changed according to the number of communication terminals.

For example, when communication module 10 includes first communication module 10A, the number of the plurality of external connecting terminals 30 may be from four to seven inclusive. Such a configuration can still further improve the degree of freedom of external connecting terminals 30.

In the present exemplary embodiment, an example has been described in which communication module 10 corresponds to WWAN communication, GNSS communication, and WLAN communication, but the present invention is not limited to this configuration. Communication module 10 may correspond to a communication system other than WWAN communication, GNSS communication, and WLAN communication.

In the present exemplary embodiment, an example has been described in which first switch device 40 includes six first switches SW11 to SW16 and second switch device 50 includes three second switches SW21 to SW23, but the present invention is not limited to this configuration. The number of first switches and the number of second switches may be freely designed.

In the present exemplary embodiment, an example has been described in which seventh communication terminal T7 is connected to seventh internal antenna ANT7 without passing through first switch device 40, but the present invention is not limited to this configuration. For example, seventh communication terminal T7 may be connected to seventh internal antenna ANT7 via first switch device 40.

In the present exemplary embodiment, an example has been described in which first switch device 40 is connected to first external connecting terminal CH1 without passing through second switch device 50, but the present invention is not limited to this configuration. For example, first switch device 40 may be connected to first external connecting terminal CH1 via second switch device 50.

In the present exemplary embodiment, Example 1 and Example 2 have been described as examples of connection of the plurality of communication terminals T1 to T7, the plurality of internal antennas 20, and the plurality of external connecting terminals 30 in communication device 1, but the present invention is not limited to this configuration. In communication device 1, connections other than those of Example 1 and Example 2 may be realized.

In the present exemplary embodiment, the configuration of communication device 1 has been described using the wiring pattern and the switch configuration illustrated in FIGS. 2 and 5, but the present invention is not limited to this configuration. The wiring pattern and the switch configuration may be changed, increased or decreased, integrated, or divided.

In the present exemplary embodiment, an example has been described in which communication device 1 includes power source 70, but the present invention is not limited to this configuration. Power source 70 is not an essential component. For example, when it is not necessary to apply a voltage for driving an external device, communication device 1 does not have to include power source 70.

In the present exemplary embodiment, an example has been described in which controller 60 controls first switch device 40, second switch device 50, and power source 70 using 14 control signals CS11, CS21 to CS24, CS31, CS36, CS41 to 43, CS5V, but the present invention is not limited to this configuration. For example, the number of control signals may be increased or decreased according to the number of communication terminals.

For example, when there is an overlapping connection setting in the connection between the plurality of external connecting terminals 30 and the plurality of communication terminals T1 to T7, controller 60 does not have to control the overlapping connection setting.

For example, controller 60 may use an Invert signal to standardize the control signals and reduce the number of control signals.

FIG. 13 is a table illustrating an example of a control signal when an Invert signal is used. As illustrated in FIG. 13, controller 60 may control first switch device 40 and second switch device 50 using Invert signals. With such a configuration, the number of control signals can be reduced to nine as compared with the first exemplary embodiment.

Second Exemplary Embodiment

An electronic device according to a second exemplary embodiment of the present disclosure will be described. The second exemplary embodiment will be described mainly on the points different from the first exemplary embodiment. In the description of the second exemplary embodiment, a configuration identical or equivalent to that of the first exemplary embodiment will be denoted by the same reference mark. In addition, the description already given for the first exemplary embodiment will be omitted for the second exemplary embodiment.

Figure 14:
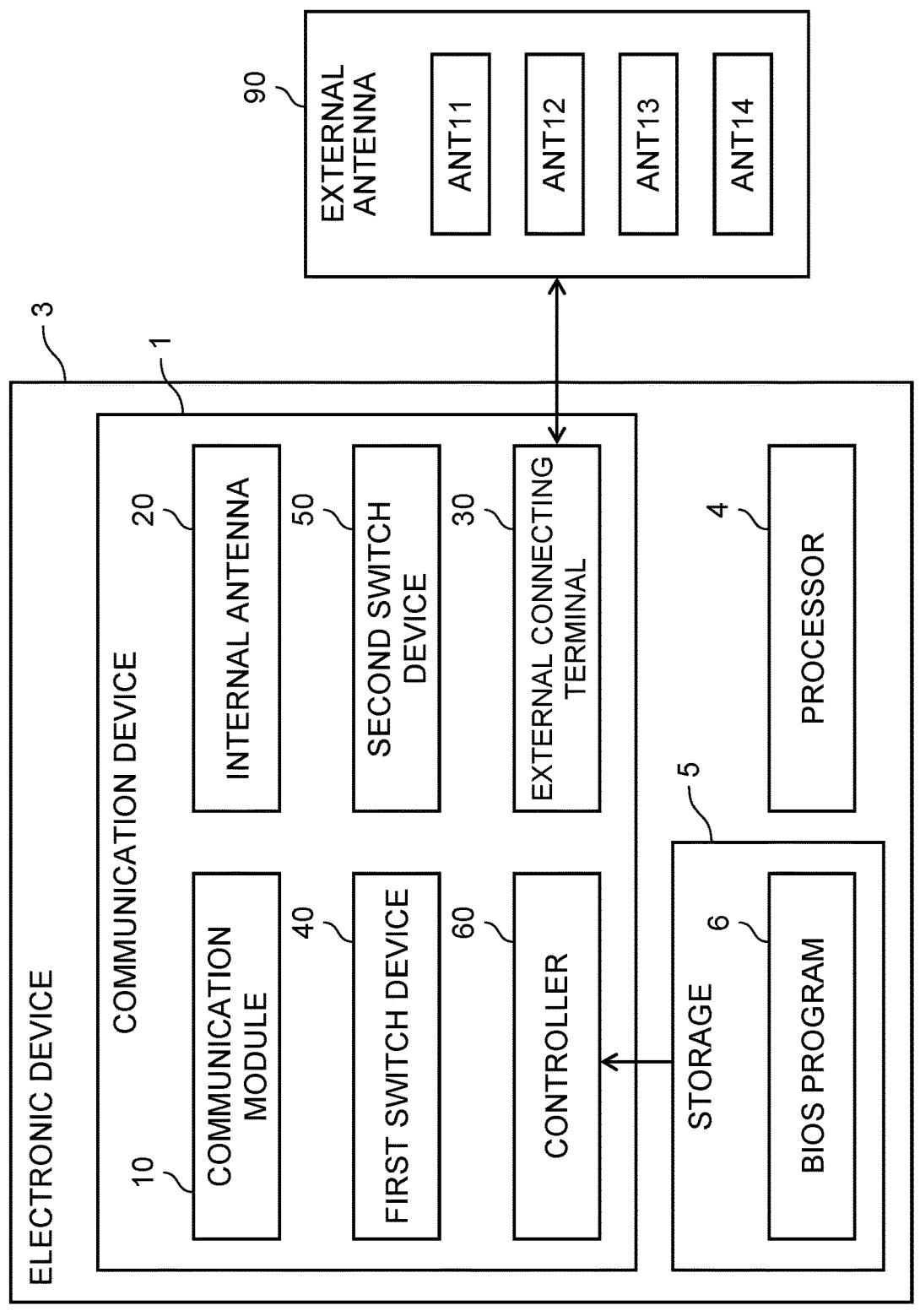
FIG. 14 is a schematic block diagram illustrating an example of a configuration of an electronic device of a second exemplary embodiment according to the present disclosure.
Figure 16:
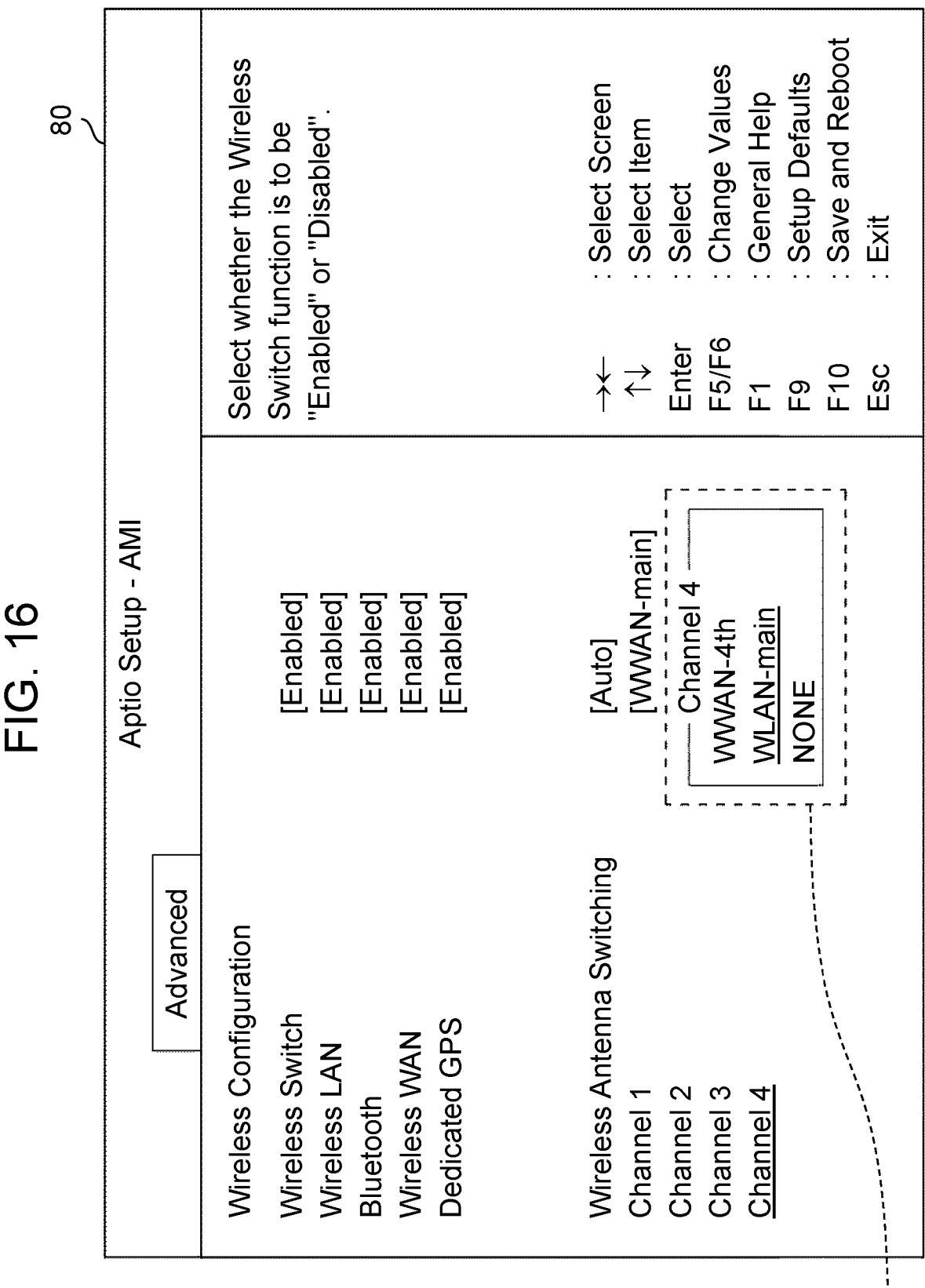
FIG. 16 is a schematic diagram illustrating an example of a connection setting of a plurality of external connecting terminals.

An example of an electronic device according to the second exemplary embodiment will be described with reference to FIGS. 14 to 16. FIG. 14 is a schematic block diagram illustrating an example of a configuration of electronic device 3 of the second exemplary embodiment according to the present disclosure. FIG. 15 is a schematic diagram illustrating an example of a connection setting of a plurality of external connecting terminals CH1 to CH4. FIG. 16 is a schematic diagram illustrating an example of a connection setting of a plurality of external connecting terminals CH1 to CH4.

In the second exemplary embodiment, electronic device 3 including communication device 1 of the first exemplary embodiment will be described. Electronic device 3 includes, for example, a laptop PC, a tablet PC, and a smartphone.

As illustrated in FIG. 14, electronic device 3 includes communication device 1, processor 4, and storage 5. Electronic device 3 is connected to a plurality of external antennas 90.

Processor 4 integrally controls components of electronic device 3. Processor 4 is a processing circuit such as a central processing unit (CPU). Processor 4 realizes predetermined functions by reading out data and programs stored in storage 5 to perform various arithmetic processing.

Storage 5 is a storage medium that stores programs and data necessary to realize functions of electronic device 3. For example, storage 5 can be realized by, for example, a hard disk (HDD), a solid state drive (SSD), a read only memory (ROM), a random access memory (RAM), a dynamic RAM (DRAM), a ferroelectric memory, a flash memory, a magnetic disk, or a combination thereof.

Storage 5 stores information on the connection setting between the plurality of communication terminals T1 to T6 and the plurality of external connecting terminals 30. Controller 60 of communication device 1 controls first switch device 40 and second switch device 50 based on the information on the connection setting stored in storage 5.

In the present exemplary embodiment, storage 5 stores basic input output system (BIOS) program 6. For example, BIOS program 6 is stored in a ROM. The connection setting between the plurality of communication terminals T1 to T6 and the plurality of external connecting terminals 30 is set by the BIOS.

The plurality of external antennas 90 are connected to the plurality of external connecting terminals 30. The plurality of external antennas 90 include, for example, external antennas corresponding to WWAN signals, GNSS signals, or WLAN signals.

In the present exemplary embodiment, the plurality of external antennas 90 includes four external antennas ANT11 to ANT14.

Connection Setting of External Connecting Terminal

FIGS. 15 and 16 is a schematic diagram illustrating an example of a connection setting of a plurality of external connecting terminals CH1 to CH4. FIGS. 15 and 16 illustrate an example in which a connection setting of the plurality of external connecting terminals CH1 to CH4 is performed by the BIOS.

As illustrated in FIG. 15, setting item 81 for performing the connection setting of the plurality of external connecting terminals CH1 to CH4 is displayed on BIOS screen 80. In setting item 81, Channel 1 to Channel 4 indicate a plurality of external connecting terminals CH1 to CH4, respectively. In setting item 81, a plurality of communication terminals T2 to T6 connected to the plurality of external connecting terminals CH1 to CH4 can be set for each of Channel 1 to Channel 4.

In FIG. 15, "WWAN-main" indicates first communication terminal T1, "GNSS" indicates fifth communication terminal T5, "WWAN-aux" indicates second communication terminal T2, and "None" indicates no connection.

As an example, an operation of the connection setting of fourth external connecting terminal CH4 will be described with reference to FIG. 16. As illustrated in FIG. 16, the user selects Channel 4 on BIOS screen 80. When Channel 4 is selected, setting screen 82 is displayed.

A plurality of communication terminals connectable to fourth external connecting terminal CH4 are displayed on setting screen 82. The user selects one of the plurality of communication terminals displayed on setting screen 82. For example, the user selects "WLAN-main" from "WWAN-4th", "WLAN-main", and "None" on setting screen 82. Fourth external connecting terminal CH4 is thus set to "WLAN-main".

In FIG. 16, "WWAN-4th" indicates fourth communication terminal T4, "WLAN-main" indicates sixth communication terminal T6, and "None" indicates no connection.

In the above description, an example of the connection setting of Channel 4 has been described, but the same applies to Channels 1 to 3.

In the present exemplary embodiment, the plurality of communication terminals displayed on setting screen 82 are displayed based on the exclusive processing described in the first exemplary embodiment and the connection setting in which the overlapping combination is deleted.

For example, when "WWAN-GPS" is set on setting screen 82 of Channel 2, "WWAN-aux" is not displayed on setting screen 82 of Channel 3. When "WWAN-aux" is set on setting screen 82 of Channel 3, "WWAN-GPS" is not displayed on setting screen 82 of Channel 2. The "WWAN-GPS" and the "WWAN-aux" commonly use second communication terminal T2. Thus, the display of setting screen 82 is controlled such that second communication terminal T2 is connected to only either Channel 2 or Channel 3.

Effects

According to electronic device 3 of the second exemplary embodiment, the following effects can be obtained.

Electronic device 3 includes communication device 1. Such a configuration can achieve effects of communication device 1 described in the first exemplary embodiment.

Electronic device 3 includes storage 5 that stores information on the connection setting between the plurality of communication terminals T1 to T6 and the plurality of external connecting terminals CH1 to CH4. The connection setting is set by the BIOS and is stored in storage 5. Controller 60 controls first switch device 40 and second switch device 50 based on the information on the connection setting stored in storage 5. With such a configuration, the connection setting between the plurality of external connecting terminals 30 and the plurality of communication terminals T1 to T6 can be performed.

Further, since the connection setting can be set by the BIOS, the plurality of external connecting terminals CH1 to CH4 can be freely selected from the preset table. By displaying a table in a menu limited to an administrator such as a supervisor in the BIOS setting, it is possible to prevent an unexpected setting error and the like.

In the present exemplary embodiment, an example in which the connection setting is set by the BIOS has been described, but the present invention is not limited to this configuration. For example, an application may be started on an operation system (OS) started by electronic device 3, and connection setting may be performed by the application. Alternatively, the connection setting may be automatically performed according to an external device connected to the plurality of external connecting terminals 30. In this case, controller 60 may detect the communication system of the external device connected to the plurality of external connecting terminals 30 and set the connection setting according to the detected communication system.

Although the present disclosure has been fully described with reference to preferable exemplary embodiments and with reference to the accompanying drawings, various changes and modifications will become apparent to those skilled in the art. Such variations and modifications are to be understood as being included within the scope of the present disclosure as set forth in the appended scope of claims unless departing from the scope of the present disclosure.

The present disclosure is applicable to a communication device including an external connecting terminal and an electronic device (for example, a laptop PC, a tablet PC, or the like).

What is claimed is:

1. A communication device comprising:
a communication module including a plurality of communication terminals;
a plurality of internal antennas configured to be connectable to the plurality of communication terminals;
a plurality of external connecting terminals configured to be connectable to the plurality of communication terminals;
a first switch device that is disposed between the plurality of communication terminals and the plurality of internal antennas and switches connection destinations of the plurality of communication terminals to the plurality of internal antennas or the plurality of external connecting terminals;
a second switch device that is disposed between the first switch device and the plurality of external connecting terminals and connects one or more communication terminals among the plurality of communication terminals connected to the first switch device to one or more external connecting terminals among the plurality of external connecting terminals; and
a controller that controls the first switch device and the second switch device.

2. The communication device according to claim 1, wherein
the first switch device includes a plurality of first switches disposed between the plurality of communication terminals and the plurality of internal antennas,
the second switch device includes a plurality of second switches disposed between the plurality of first switches and the plurality of external connecting terminals, and
each of the plurality of second switches is connected in series with two or more first switches among the plurality of first switches.

3. The communication device according to claim 1, wherein
the communication module includes at least one of
a first communication module corresponding to Wireless Wide Area Network (WWAN) communication,
a second communication module that receives a Global Navigation Satellite System (GNSS) signal, and a third communication module corresponding to Wireless Local Area Network (WLAN) communication.

4. The communication device according to claim 3, wherein the communication module includes at least the first communication module, and a number of the plurality of external connecting terminals is from four to seven inclusive.

5. The communication device according to claim 3, wherein the communication module includes the first communication module, the second communication module, and the third communication module, the plurality of external connecting terminals include a first external connecting terminal, a second external connecting terminal, a third external connecting terminal, and a fourth external connecting terminal, the first communication module includes a first communication terminal, a second communication terminal, a third communication terminal, and a fourth communication terminal that transmit and receive a WWAN signal, the second communication module includes a fifth communication terminal corresponding to a GNSS signal, the third communication module includes a sixth communication terminal and a seventh communication terminal that transmit and receive a WLAN signal, the first external connecting terminal is configured to be connectable to the first communication terminal, and the second switch device includes a first external connection selection switch that connects either the second communication terminal or the fifth communication terminal to the second external connecting terminal, a second external connection selection switch that connects either the second communication terminal or the third communication terminal to the third external connecting terminal, and a third external connection selection switch that connects either the fourth communication terminal or the sixth communication terminal to the fourth external connecting terminal.

6. The communication device according to claim 5, wherein the second communication terminal corresponds to the WWAN signal and a WWAN-GPS signal, when the first external connection selection switch connects the second communication terminal and the second external connecting terminal, the controller does not connect the second communication terminal and the third external connecting terminal in the second external connection selection switch, and when the second external connection selection switch connects the second communication terminal and the third external connecting terminal, the controller does not connect the second communication terminal and the second external connecting terminal in the first external connection selection switch.

7. The communication device according to claim 6, wherein the plurality of internal antennas include a first internal antenna, a second internal antenna, a third internal antenna, a fourth internal antenna, a fifth internal antenna, a sixth internal antenna, and a seventh internal antenna, the seventh communication terminal is connected to the seventh internal antenna, and the first switch device includes a first internal connection selection switch that connects the first communication terminal to the first internal antenna or the first external connecting terminal, a second internal connection selection switch that connects the second communication terminal to the second internal antenna, the first external connection selection switch, or the second external connection selection switch, a third internal connection selection switch that connects the third communication terminal to the third internal antenna or the second external connection selection switch, a fourth internal connection selection switch that connects the fourth communication terminal to the fourth internal antenna or the third external connection selection switch, a fifth internal connection selection switch that connects the fifth communication terminal to the fifth internal antenna or the first external connection selection switch, and a sixth internal connection selection switch that connects the sixth communication terminal to the sixth internal antenna or the third external connection selection switch.

8. The communication device according to claim 1, wherein the controller controls the first switch device and the second switch device using an Invert signal.

9. An electronic device comprising the communication device according to claim 1.

10. The electronic device according to claim 9, further comprising a storage that stores information on a connection setting between the plurality of communication terminals and the plurality of external connecting terminals, wherein the information on the connection setting is set by a Basic Input Output System (BIOS) and stored in the storage, and the controller controls the first switch device and the second switch device based on the information on the connection setting stored in the storage.

* * * * *